United States Patent
Welch et al.

(10) Patent No.: US 9,743,204 B1
(45) Date of Patent: Aug. 22, 2017

(54) MULTI-ORIENTATION PLAYBACK DEVICE MICROPHONES

(71) Applicant: Sonos, Inc., Santa Barbara, CA (US)

(72) Inventors: Brendan Welch, Uxbridge, MA (US); Romi Kadri, Boston, MA (US); Jonathon Reilly, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/282,554

(22) Filed: Sep. 30, 2016

(51) Int. Cl.
*H04R 29/00* (2006.01)

(52) U.S. Cl.
CPC ......... *H04R 29/005* (2013.01); *H04R 29/007* (2013.01); *H04R 2227/003* (2013.01); *H04R 2227/005* (2013.01)

(58) Field of Classification Search
CPC ................ H04R 29/005; H04R 29/007; H04R 2227/003
See application file for complete search history.

(56) References Cited

U.S. PATENT DOCUMENTS

| | | | |
|---|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |

(Continued)

FOREIGN PATENT DOCUMENTS

| | | |
|---|---|---|
| EP | 1389853 A1 | 2/2004 |
| WO | 0153994 | 7/2001 |

(Continued)

OTHER PUBLICATIONS

US 9,299,346, 03/2016, Hart et al. (withdrawn)

(Continued)

*Primary Examiner* — Brenda Bernardi

(57) ABSTRACT

Aspects of a multi-orientation playback device including at least one microphone array are discussed. A method may include determining an orientation of the playback device which includes at least one microphone array and determining at least one microphone training response for the playback device from a plurality of microphone training responses based on the orientation of the playback device. The at least one microphone array can detect a sound input, and the location information of a source of the sound input can be determined based on the at least one microphone training response and the detected sound input. Based on the location information of the source, the directional focus of the at least one microphone array can be adjusted, and the sound input can be captured based on the adjusted directional focus.

20 Claims, 8 Drawing Sheets

(56) References Cited

U.S. PATENT DOCUMENTS

| | | |
|---|---|---|
| 7,295,548 B2 | 11/2007 | Blank et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington et al. |
| 8,483,853 B1 | 7/2013 | Lambourne |
| 8,938,394 B1 | 1/2015 | Faaborg et al. |
| 8,983,844 B1 | 3/2015 | Thomas et al. |
| 9,042,556 B2 * | 5/2015 | Kallai ............... H04R 3/12 381/11 |
| 9,215,545 B2 | 12/2015 | Dublin et al. |
| 9,288,597 B2 | 3/2016 | Carlsson et al. |
| 9,300,266 B2 | 3/2016 | Grokop |
| 9,318,107 B1 | 4/2016 | Sharifi |
| 9,319,816 B1 | 4/2016 | Narayanan |
| 9,426,567 B2 * | 8/2016 | Lee ............... H04M 1/6008 |
| 9,431,021 B1 | 8/2016 | Scalise et al. |
| 9,443,527 B1 | 9/2016 | Watanabe et al. |
| 9,472,201 B1 | 10/2016 | Sleator |
| 9,472,203 B1 | 10/2016 | Ayrapetian et al. |
| 9,489,948 B1 | 11/2016 | Chu et al. |
| 9,494,683 B1 | 11/2016 | Sadek |
| 9,509,269 B1 | 11/2016 | Rosenberg |
| 9,514,752 B2 | 12/2016 | Sharifi |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2007/0142944 A1 | 6/2007 | Goldberg et al. |
| 2011/0280422 A1 | 11/2011 | Neumeyer et al. |
| 2014/0075306 A1 | 3/2014 | Rega |
| 2015/0154976 A1 | 6/2015 | Mutagi |
| 2015/0280676 A1 | 10/2015 | Holman et al. |
| 2015/0341406 A1 | 11/2015 | Rockefeller et al. |
| 2015/0363061 A1 | 12/2015 | De Nigris, III et al. |
| 2015/0363401 A1 | 12/2015 | Chen et al. |
| 2016/0007116 A1 | 1/2016 | Holman |
| 2016/0021458 A1 | 1/2016 | Johnson et al. |
| 2016/0029142 A1 | 1/2016 | Isaac |
| 2016/0042748 A1 | 2/2016 | Jain et al. |
| 2016/0098393 A1 | 4/2016 | Hebert |
| 2016/0173578 A1 | 6/2016 | Sharma et al. |
| 2016/0239255 A1 | 8/2016 | Chavez et al. |
| 2016/0314782 A1 | 10/2016 | Klimanis |

FOREIGN PATENT DOCUMENTS

| | | |
|---|---|---|
| WO | 03093950 A2 | 11/2003 |
| WO | 2015178950 A1 | 11/2015 |

OTHER PUBLICATIONS

"AudioTron Quick Start Guide, Version 1.0", Voyetra Turtle Beach, Inc., Mar. 2001, 24 pages.

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 retrieved Jun. 18, 2014, 2 pages.

"Denon 2003-2004 Product Catalog," Denon, 2003-2004, 44 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

UPnP; "Universal Plug and Play evice Architecture," Jun. 8, 2000; version 1.0; Microsoft Corporation; pp. 1-54.

Non-Final Office Action dated Dec. 12, 2016, issued in connection with U.S. Appl. No. 15/098,718, filed Apr. 14, 2016, 11 pages.

Non-Final Office Action dated Jan. 13, 2017, issued in connection with U.S. Appl. No. 15/098,805, filed Apr. 14, 2016, 11 pages.

U.S. Appl. No. 60/490,768, filed Jul. 28, 2003, entitled "Method for synchronizing audio playback between multiple networked devices," 13 pages.

U.S. Appl. No. 60/825,407, filed Sep. 12, 2003, entitled "Controlling and manipulating groupings in a multi-zone music or media system," 82 pages.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

MULTI-ORIENTATION PLAYBACK DEVICE MICROPHONES

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
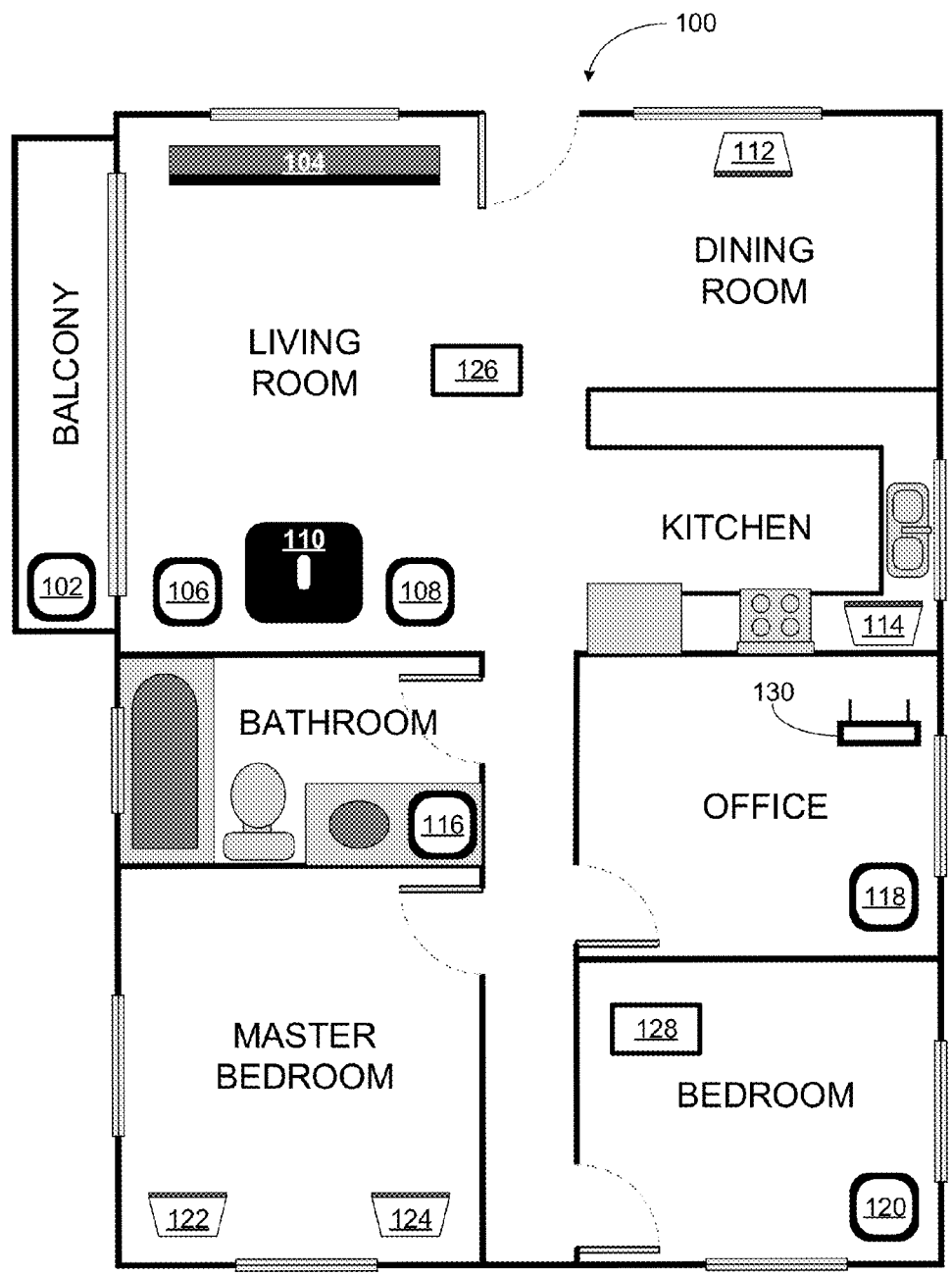
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Some embodiments described herein involve adjusting directional focus of at least one microphone array trained based on the orientation of a playback device. Microphone arrays on a multi-orientation device may have different sensitivities and response profiles to sound coming from the same direction across different orientations of the device. In obtaining training response values (e.g., calibration response values, measured response values) of the microphone arrays in different playback device orientations, a general response profile for various playback device orientations can be created. In comparing the general response profile to a response profile of a received sound input response, a location (e.g., direction in one or more dimensions) of the source of the sound input can be identified or estimated.

The examples provided herein involve a method, a playback device, and a system. The method may include determining an orientation of the playback device which includes at least one microphone array and determining at least one microphone training response for the playback device from a plurality of microphone training responses based on the orientation of the playback device. The at least one microphone array can detect a sound input, and the location information of a source of the sound input can be determined based on the at least one microphone training response and the detected sound input. Based on the location information of the source, the directional focus of the at least one microphone array can be adjusted, and the sound input can be captured based on the adjusted directional focus.

In another aspect, a non-transitory computer-readable medium is provided. The non-transitory computer readable medium has stored thereon instructions executable by a computing device to cause the computing device to perform functions. The functions include determining an orientation of the playback device which includes at least one microphone array and determining at least one microphone training response for the playback device from a plurality of microphone training responses based on the orientation of the playback device. The at least one microphone array can detect a sound input, and the location information of a source of the sound input can be determined based on the at least one microphone training response and the detected sound input. Based on the location information of the source, the directional focus of the at least one microphone array can be adjusted, and the sound input can be captured based on the adjusted directional focus.

In yet another aspect, an apparatus is provided. The apparatus includes a processor and a memory. The memory has stored thereon instructions executable by the apparatus to cause the system to perform functions. The functions include determining an orientation of the playback device which includes at least one microphone array and determining at least one microphone training response for the playback device from a plurality of microphone training responses based on the orientation of the playback device. The at least one microphone array can detect a sound input, and the location information of a source of the sound input can be determined based on the at least one microphone training response and the detected sound input. Based on the location information of the source, the directional focus of the at least one microphone array can be adjusted, and the sound input can be captured based on the adjusted directional focus.

While some examples described herein may refer to functions performed by given actors such as "users" and/or other entities, it should be understood that this is for purposes of explanation only. The claims should not be interpreted to require action by any such example actor unless explicitly required by the language of the claims themselves.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
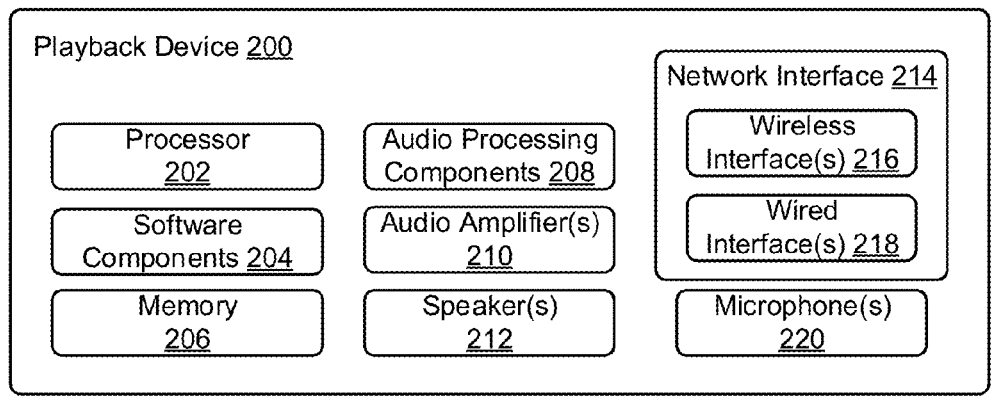
FIG. 2 shows a functional block diagram of an example playback device according to aspects described herein.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
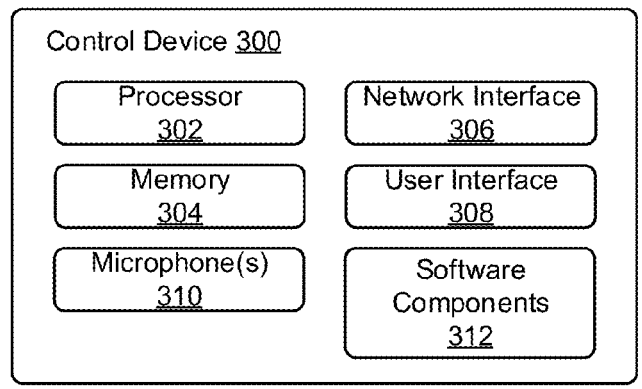
FIG. 3 shows a functional block diagram of an example control device according to aspects described herein.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
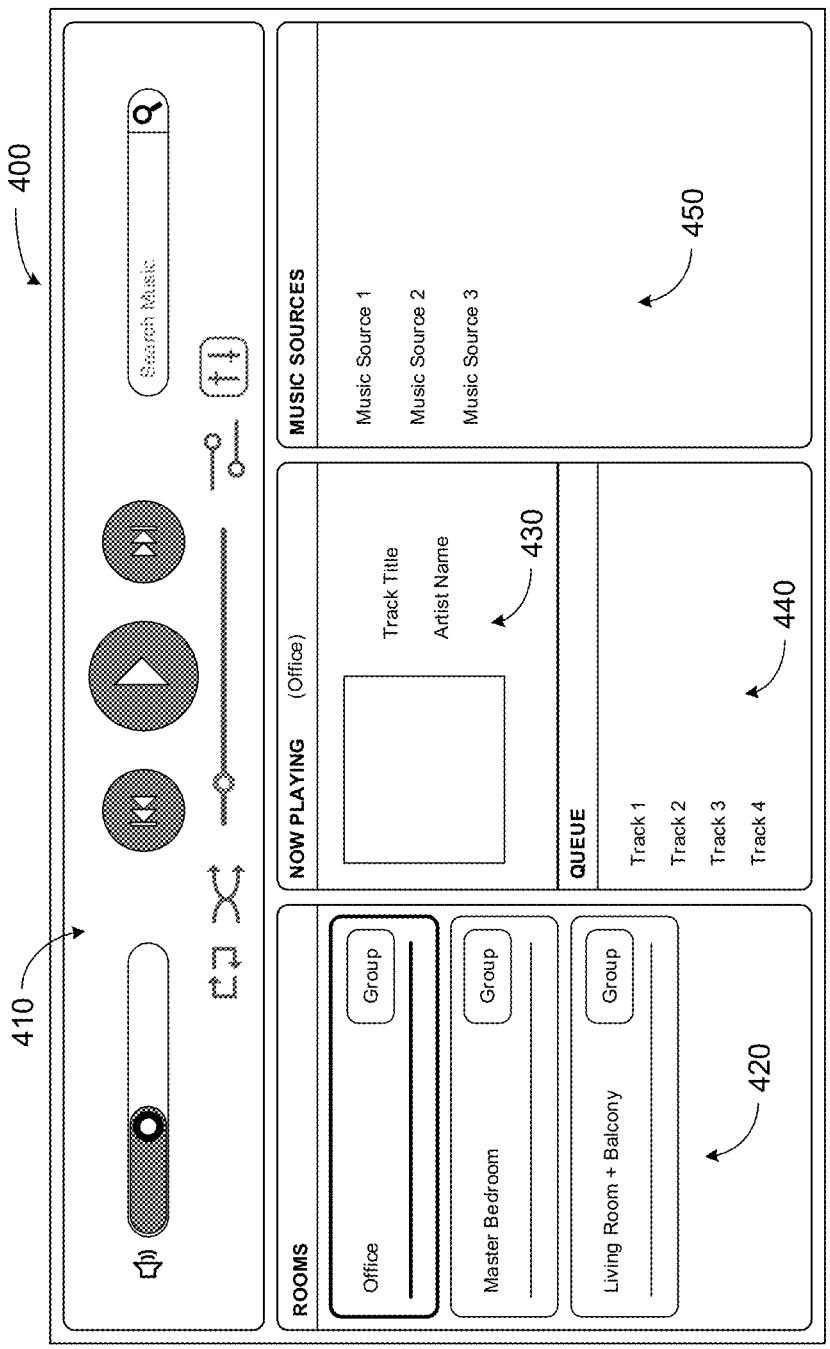
FIG. 4 shows an example controller interface according to aspects described herein.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
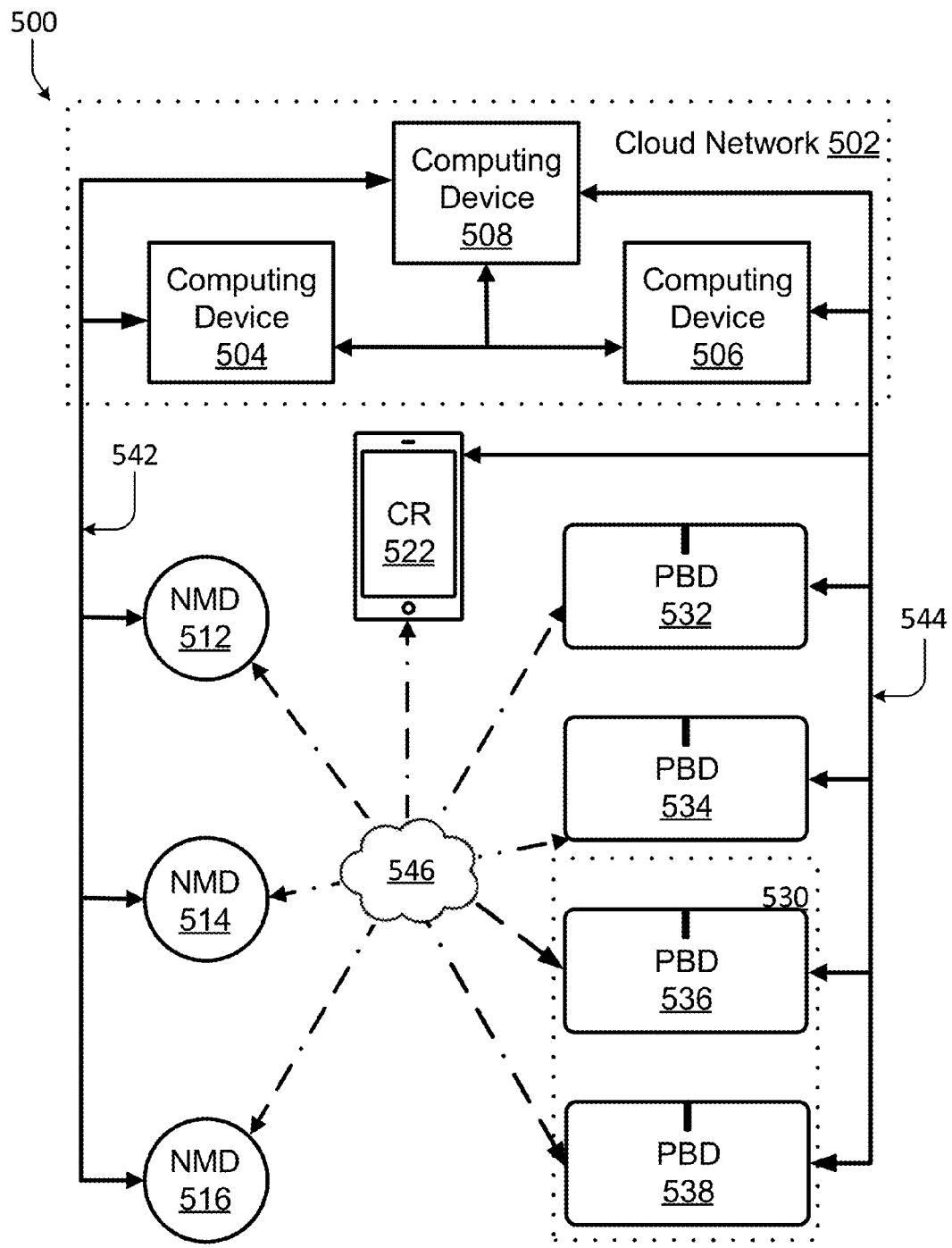
FIG. 5 shows an example plurality of network devices according to aspects described herein.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300. In an example, one or more of NMDs 512, 514, and/or 516 may include multiple microphones arranged in a microphone array.

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506. In another example, the computing device 504 may convert the voice input to an equivalent text command, and then subsequently transmit the text command to the computing device 506. The computing device 506 may then parse the text command to identify one or more playback commands.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

In yet another example, the computing device 504 may perform some processing to identify the relevant command or intent of the user and provide information regarding media content relevant to the voice input to the computing device 506. For example, the computing device 504 may perform the speech-to-text conversion of the voice input and analyze the voice input for a command or intent (e.g., play, pause, stop, volume up, volume down, skip, next, group, ungroup) along with other information about how to execute the command. The computing device 504 or the computing device 506 may determine what PBD commands correspond to the command or intent determined by the computing device 504. The command or intent determined from the voice input and/or other information related to executing the command may be transmitted from the computing device 504 to the computing device 506. The processing on the computing device 504 may be performed by an application, a module, add-on software, an integration with the native networked microphone system software platform, and/or the native networked microphone system software platform.

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
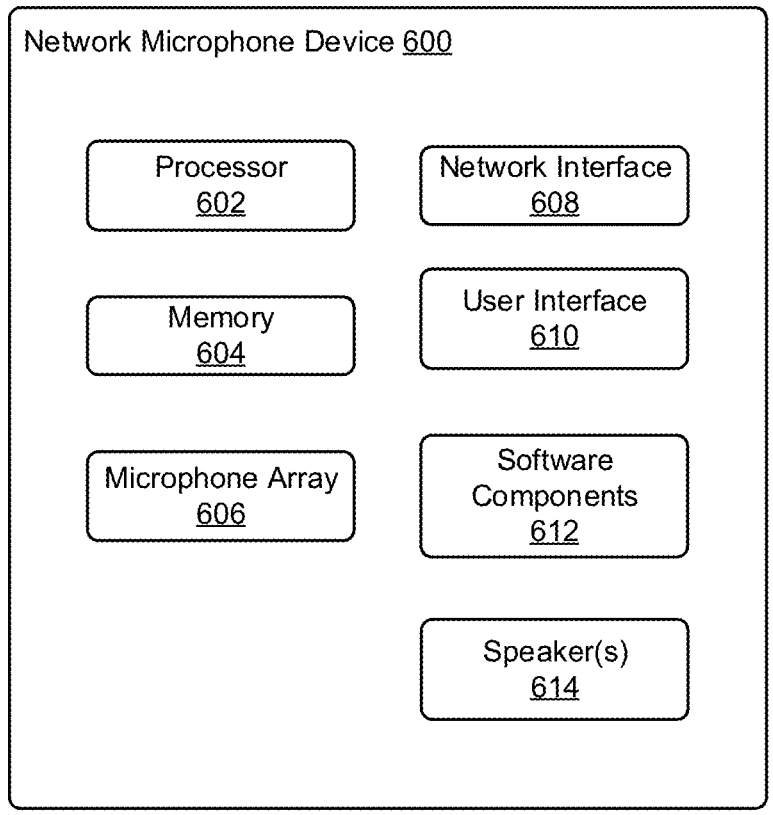
FIG. 6 shows a function block diagram of an example network microphone device according to aspects described herein.

FIG. 6 shows a function block diagram of an example network microphone device 600 that may be configured to be one or more of NMDs 512, 514, and 516 of FIG. 5. As shown, the network microphone device 600 includes a processor 602, memory 604, a microphone array 606, a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The processor 602 may include one or more processors and/or controllers, which may take the form of a general or special-purpose processor or controller. For instance, the processing unit 602 may include microprocessors, microcontrollers, application-specific integrated circuits, digital signal processors, and the like. The memory 604 may be data storage that can be loaded with one or more of the software components executable by the processor 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing device 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Multi-Orientation Microphone Array(s) of a Media Playback System As discussed above, embodiments described herein may involve one or more microphone arrays which can be trained to capture and process sound input based on the particular orientation of a playback device.

Figure 7A:
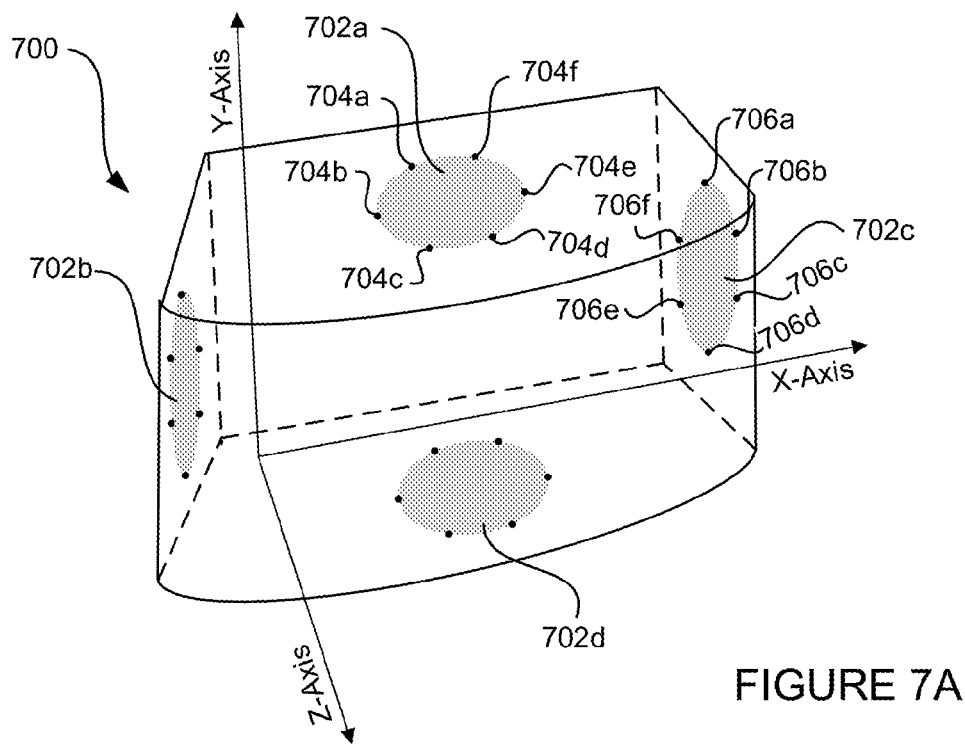
FIGS. 7A-7B depict respective perspective views of orientations of a playback device according to aspects described herein.
Figure 7B:
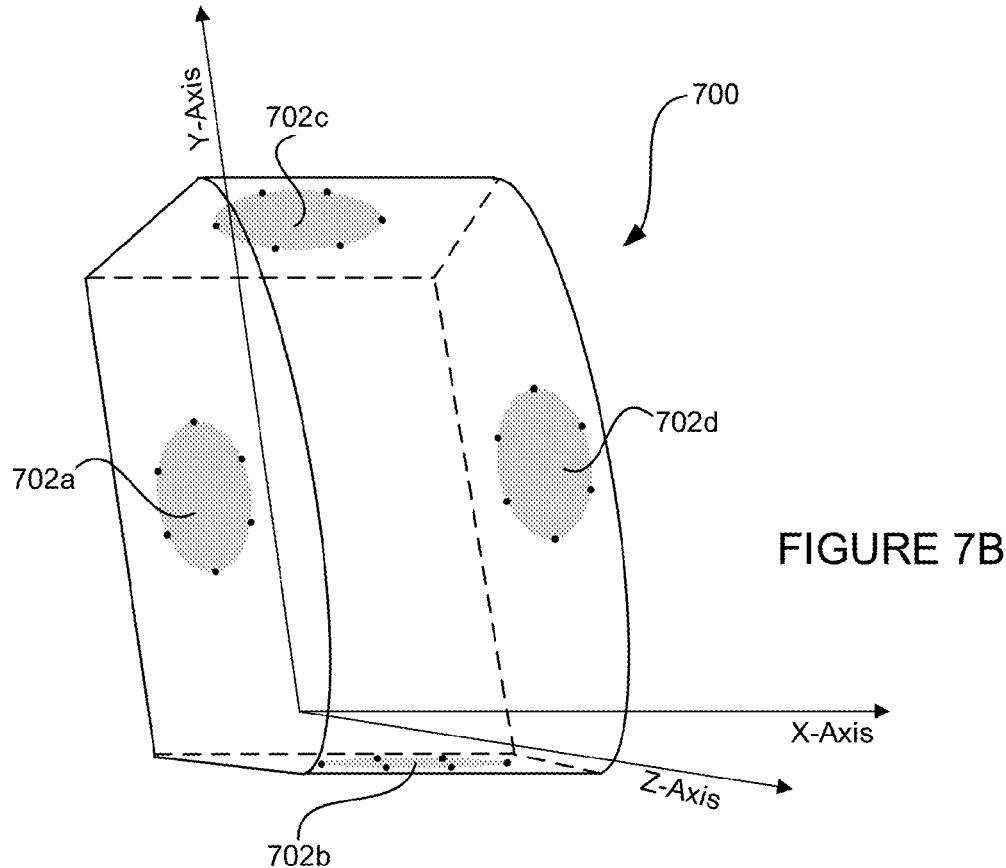

FIGS. 7A-7B show respective perspective views of an example playback device 700 in different orientations. Playback device 700 may be positioned in different orientations by setting playback device 700 on different faces or sides of playback device 700, and FIGS. 7A and 7B show two examples of orientations for playback device 700. FIG. 7A shows a perspective view of playback device 700 in a first orientation, and FIG. 7B shows a perspective view of playback device 700 in a second orientation. For ease of discussion, the first orientation shown in FIG. 7A where playback device 700 rests on one of its longer sides may be referred to as a horizontal orientation, and the second orientation shown in FIG. 7B where playback device 700 rests on one of its shorter sides may be referred to as a vertical orientation. The playback device 700 may be set on a surface along any of its sides or faces.

Playback device 700 may have one or more microphone arrays 702 (e.g., microphone array 702a, microphone array 702b, microphone array 702c, microphone array 702d) instsalled in or mounted on a housing or body of playback device 700. Microphone arrays 702a-d are shown as examples of approximate microphone array placement integrated into a playback device. More or less microphone arrays may be used and microphone arrays may be placed along other sides or walls not shown in FIGS. 7A-7B. Further, more than one microphone array may be positioned on the same side of a playback device.

Playback device 700 may be playback device 200 and microphone arrays 702 may be microphone(s) 220. In some aspects, a microphone array 702 may include a NMD (e.g., NMDs 512, 514, 516) which can be mounted on or otherwise attached to different walls or sides of playback device 700 or may be microphone array 606. In different playback device orientations, the microphone arrays 702 will also have different orientations, and different microphone arrays will be more conducive to capturing sound input (e.g., voice input, audio input, tonal input) depending on their individual orientations. Each microphone array may be comprised of two or more individual microphones positioned at different points in the array. The microphone array 702 may have circular shape, and the individual microphones may be distributed around a circumference of the microphone array 702 (e.g., every x degrees between 0 to 360 degrees). For example, microphone array 702a has individual microphones 704a-704f.

As illustrated in FIG. 7A, playback device 700 may be placed in a substantially or approximately horizontal orientation where a longest side of playback device 700 is parallel to a surface (e.g., table, floor) along the x-z plane. In this orientation, microphone arrays 702 have various orientations. For example, a first microphone array 702a may be on a top surface in this orientation and substantially parallel to the x-z plane while a second microphone array 702b may be positioned substantially along the y-z plane and have an orientation substantially vertical. Microphone arrays 702 may be most sensitive to sound along a plane parallel to the microphone array. For example, microphone array 702a in the horizontal orientation (e.g., perpendicular to gravity) may be better able to discern location of a source of sound. Microphone array 702a may be in a position to best detect and capture sound input because of its placement on top of playback device 700.

FIG. 7B shows playback device 700 in a second orientation which may be a substantially vertical orientation where a longest side of playback device 700 is substantially perpendicular to a surface along the x-z plane and substantially parallel to the y-axis. In this orientation, microphone arrays 702b, 702c may be substantially horizontal and microphone arrays 702a, 702d may be substantially vertical.

Other placement positions are possible which are not shown including, for example, along the face or the back of playback device 700. Additionally, other shapes of speakers (e.g., cylindrical, triangular, irregular) may be possible providing microphone array orientations which may be oriented between different planes. In some aspects, the microphone array might not be positioned to be parallel to the wall of the playback device nearest to it.

Figure 8:
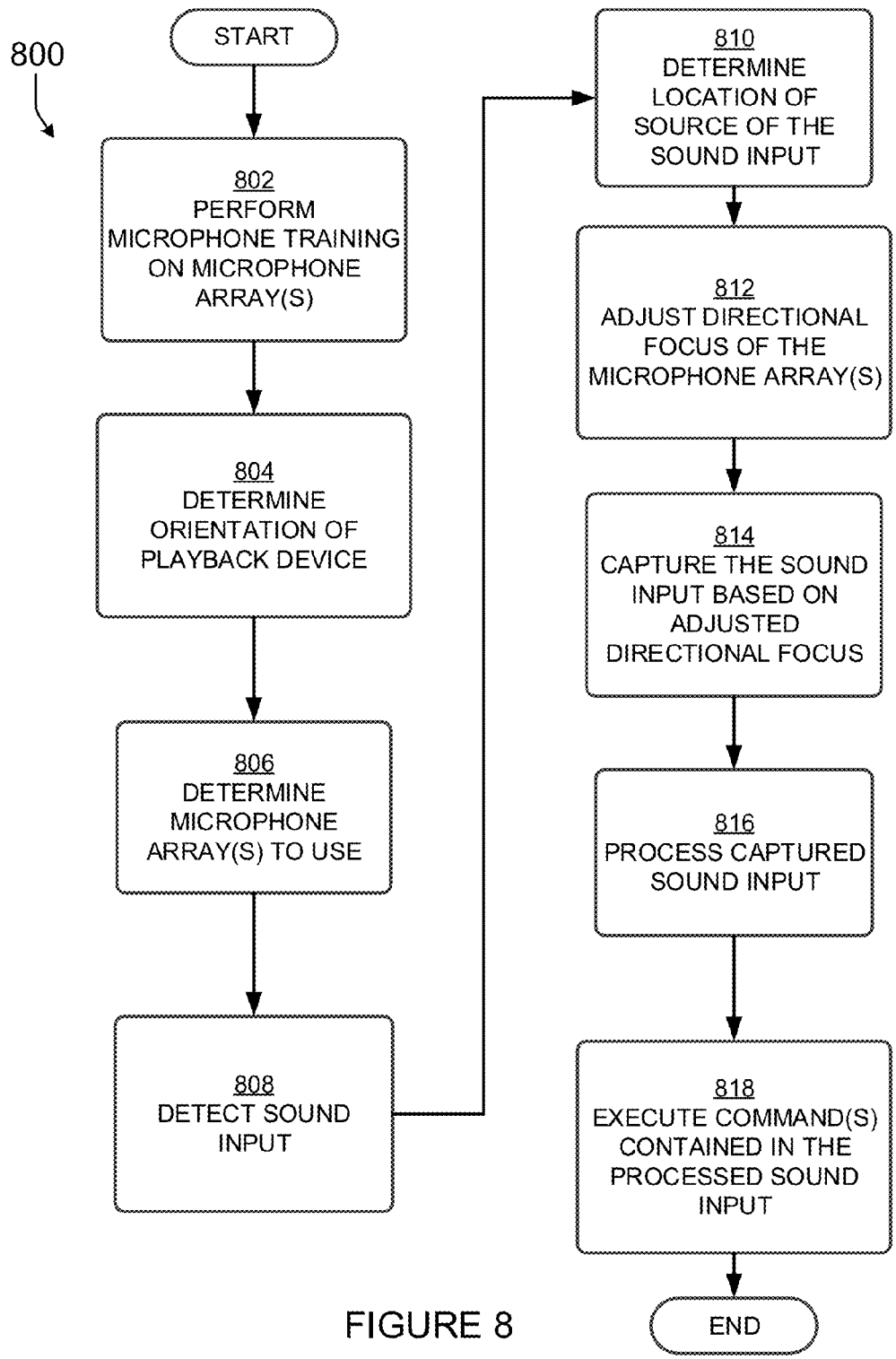
FIG. 8 illustrates an example flow diagram 800 of a method for processing sound input based on playback device orientation according to aspects described herein.

FIG. 8 shows an example flow diagram 800 of a method for processing sound input based on playback device orientation. Method 800 presents an embodiment of a method that can be implemented within an operating environment involving, for example, the media playback system 100 of FIG. 1, one or more of the playback device 200 of FIG. 2, one or more of the control device 300 of FIG. 3, one or more of the plurality of devices in system 500 of FIG. 5, one or more of the plurality of devices in system 600, and playback device 700 in FIGS. 7A-7B. Method 800 may include one or more operations, functions, or actions. Although the blocks in FIG. 8 are illustrated in sequential order, these blocks may also be performed in parallel, and/or in a different order than those described herein. Also, the various blocks may be combined into fewer blocks, divided into additional blocks, and/or removed based upon the desired implementation.

In addition, for method 800 and other processes and methods disclosed herein, the flow diagrams show functionality and operation of one possible implementation of present embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 800 and other processes and methods disclosed herein, each block in FIG. 8 may represent circuitry that is wired to perform the specific logical functions in the process.

At block 802, microphone training may be performed on the microphone array(s) 702 of playback device 700. Microphone training may produce a response profile for the microphone array(s) of playback device 700. Microphone training may be completed during a calibration process which may be, for example, as part of the manufacturing process or after manufacturing. Microphone training may include capturing individual microphone responses (e.g., polar response) to test audio (e.g., tone, audio, sound, voice, noise) played from a speaker. To generate training response profile(s) for the microphone arrays 702, playback device 700 may be placed in a first orientation in a perfect or nearly perfect acoustical environment (e.g., anechoic chamber) or other acoustic environment. The test audio may be played from a speaker (e.g., speaker 902) directed towards playback device 700.

Figure 9:
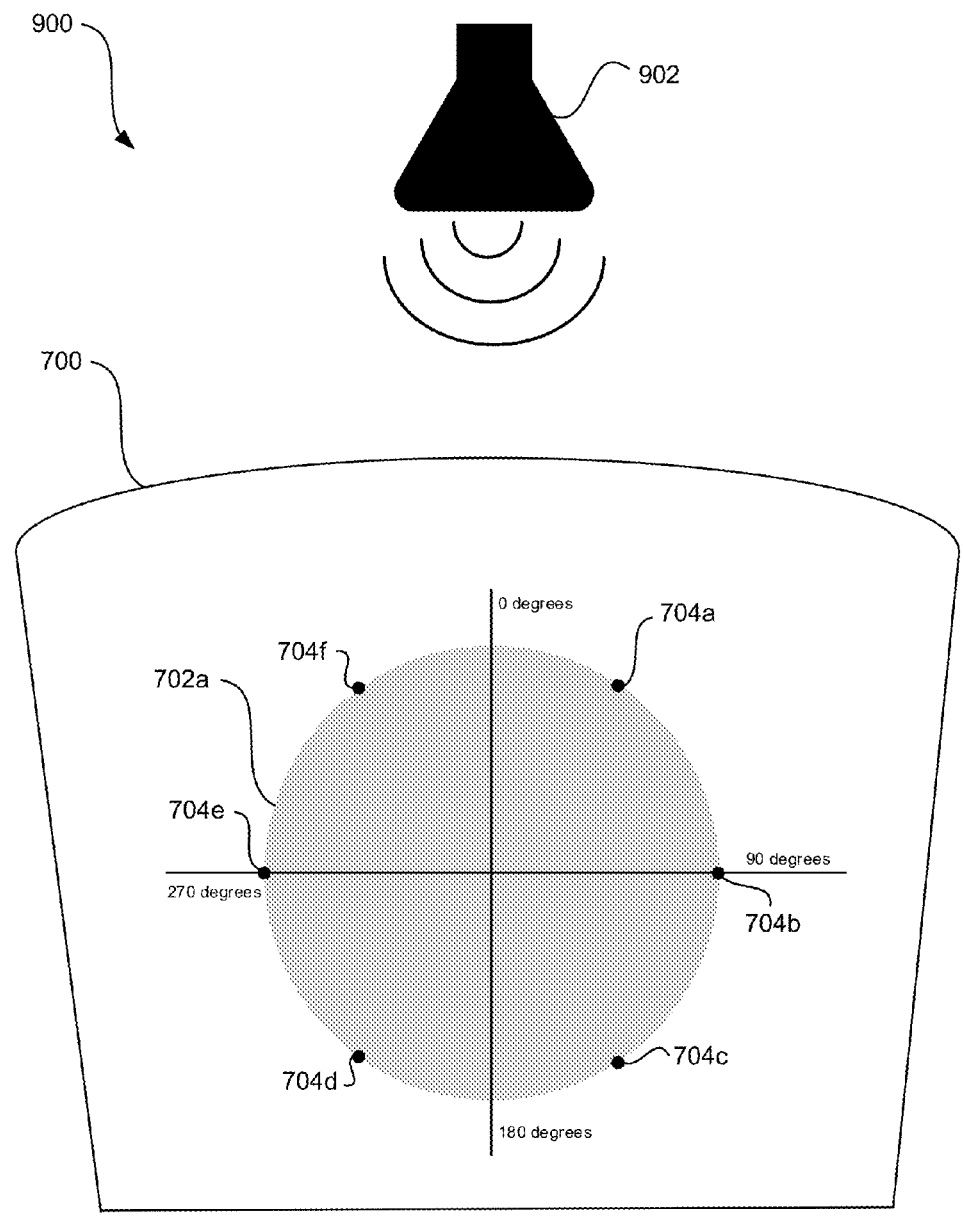
FIG. 9 shows a top view of an example calibration setup according to aspects described herein.

A top view of an example of the calibration setup 900 is described with respect to block 802 and shown in FIG. 9. For a first measurement capture, speaker 902 may be directed towards the front center of playback device 700 which may be on axis with a center of microphone array 702a, and this position may be referred to as being a starting test position and/or identified as being at the 0 degree position. The test audio may be played by speaker 902. The first microphone array may receive the test audio and measure the response of each of the individual microphones in the array. The measured response of each individual microphone to the test audio may be stored as a set of measured responses for a first test audio position (e.g., 0 degree position) and/or the measured response may be stored as a relative value (e.g., difference) between the responses of different pairs of individual microphones for a first test audio position (e.g., 0 degree position). Each response value may have a magnitude and phase component. A first set of measured responses may be stored as a matrix or table such as Table 1 shown below. Microphone array 702a may have six individual microphones identified as microphones 704a, 704b, 704c, 704d, 704e, and 704f.

TABLE 1

| Mic 704 | a | b | c | d | e | f |
|---|---|---|---|---|---|---|
| a | — | — | — | — | — | — |
| b | $R_{b,a} = R_b - R_a$ | — | — | — | — | — |
| c | $R_{c,a} = R_c - R_a$ | $R_{c,b} = R_c - R_b$ | — | — | — | — |
| d | $R_{d,a} = R_d - R_a$ | $R_{d,b} = R_d - R_b$ | $R_{d,c} = R_d - R_c$ | — | — | — |

TABLE 1-continued

| Mic 704 | a | b | c | d | e | f |
|---|---|---|---|---|---|---|
| e | $R_{e,a} = R_e - R_a$ | $R_{e,b} = R_e - R_b$ | $R_{e,c} = R_e - R_c$ | $R_{e,d} = R_e - R_d$ | — | — |
| f | $R_{f,a} = R_f - R_a$ | $R_{f,b} = R_f - R_b$ | $R_{f,c} = R_f - R_c$ | $R_{f,d} = R_f - R_d$ | $R_{f,e} = R_f - R_e$ | — |

In Table 1, the value $R_{b,a}$ stored in (row b, column a) may be a relative value of the response of microphone 704b to microphone 704a in the form of the response value measured for microphone 704b ($R_b$) minus the response value of microphone 704a ($R_a$). This may be repeated for each microphone relative to every other microphone in the microphone array as shown in Table 1 following the same convention. The response value may be a complex number where the magnitude of the response may be the real portion of the value and the phase may be the imaginary portion of the value. Because the values for what would be response $R_{a,b}$ in (row a, column b) may be duplicative of response $R_{b,a}$ for (row b column a), a response value might not be stored for this relative response which is shown as cells having dashes (i.e., "--") in Table 1. The set of values in Table 1 may be associated with the positional placement (e.g., relative angle) of the speaker 902 playing the test audio.

A similar set of values may be generated for microphone array 702 associated with a second speaker position by changing the positioning of the speaker relative to the front center of playback device 700 by a given number of degrees while maintaining the same distance from the center of playback device 700 or microphone array 702. For example, a second set of values for the first microphone array at the relative angle of 90 degrees may be generated or obtained by moving speaker 902 to the 90 degree position or rotating microphone array 702a or playback device 700 around a vertical axis (e.g., yaw) so that speaker 902 aligns with the 90 degree position of microphone array 702a. The measurements may be taken in smaller increments of every x degrees (e.g., every 1 degree, every 5 degrees, every 10 degrees, etc.) rotationally (e.g., clockwise, counter-clockwise) around the playback device depending on desired data resolution from 0 to 360 degrees around playback device 700.

The measurement process in block 802 may be repeated to collect values for each microphone array 702 of playback device 700 in each orientation. For example, while in a first speaker position, response values for all of the microphones of different microphone arrays may be determined each time test audio is played. In some instances, test audio may be played once per angle position and individual response values for all individual microphones and all microphone arrays determined based on the same test audio playback. Other methods of obtaining response values may be used.

At or after the end of block 802, the measurements obtained through this process may include response values of all of the microphone arrays for multiple orientations. The measurements may be organized in different data sets for different response profiles such as as a collection of measurements for each microphone array. For example, a first collection of measurements may include all measurements obtained for microphone array 702a, and a second collection of measurements may include all measurements captured for microphone array 702b.

In some aspects, the response values may be associated with each other in the form of groups of response values determined for the same microphone array in two or more different playback device orientations. A group of calibration measurements may be those measurements for a particular microphone array taken while the playback device is in a particular orientation. For example, a first group of calibration measurements may be those measurements for microphone array 702a obtained while playback device 700 is in the horizontal orientation shown in FIG. 7A, and a second group of calibration measurements may be measurements obtained for microphone array 702a while playback device 700 is in the vertical orientation shown in FIG. 7B.

In another aspect, as discussed above, a first set of measurements may be for example the measurements shown in Table 1 which can be measurements for the microphone generated from test audio played back from a first angular position for the first microphone array while in the first playback device orientation. More particularly, the first set of measurements may be measurements for each individual microphone 704 of microphone array 702a In some aspects, the measurements may be organized as vectors. Each vector may correspond to one individual microphone and include measurements values for the individual microphone across one or more speaker positions for the same orientation. For example, a first vector may include values for microphone 704a or relative values for the difference between microphone 704b and 704a in the horizontal orientation for all or every measured increment between 0 to 360 degrees for the position of speaker 902.

In some aspects, measurements may be taken for all microphone arrays from the same test audio. For example, the test audio can be played once per orientation, and response values for any or all of the individual microphones of the microphone arrays can be gathered. The values in Table 1 could be expanded to include response values or relative response values for individual microphones of more than one microphone array. An example is shown below in Table 2 for microphone array 702a and microphone array 702c. Microphone 702c array includes individual microphones 706a-f. In the example Table 2 below, $R_{y,z}$ represents response value of microphone y minus the response value of microphone z. For example, $R_{706d,\ 704c}$=response value of microphone 706d−response value of microphone 704c.

The response values discussed above may generally represent planar measurement values. In other words, the values may correspond to measurement information gathered for two dimensions. For example, for microphone array 702a in the horizontal orientation shown in FIG. 7A, the measurements may represent data along a horizontal plane (e.g., x-z plane). This can be achieved by, for example, maintaining the same height in the placement of speaker 902 when the test audio is played. While the examples have been discussed with respect to gathering response data along the horizontal plane, the data may be gathered in a vertical plane rotating playback device 700 or speaker 902 vertically (e.g., roll and/or pitch) around different axes (e.g., longitudinal and/or lateral) while maintaining the same distance from the central point.

In some aspects, the calibration values could be three-dimensional (e.g., spherical) by using a combination of data from different planes, for example, adding information gathered along a second plane (e.g., plane orthogonal to the first plane) to information gathered along the first plane. For example, measurements may be gathered along the y-z plane (e.g., vertically) by rotating speaker 902 around the x-axis and measuring the response in a similar fashion as described above.

The training or measurement values discussed herein may be obtained using one or more devices in a system. For example, playback device 700 may determine the responses of the test audio received by the microphone arrays. Playback device 700 can store the response values locally in a memory of playback device 700 and/or transmit the response values to a computing device (e.g., server, computer, or other measurement device) for processing and/or storage.

The measured response values obtained for a given playback device model may be associated with the given playback device model and/or speaker type and stored in a database or server as representative values for a given playback device model and/or microphone array model and/or individual microphone components. For example, the same values may be used for microphone arrays or individual microphones provided from the same supplier used in the same playback device model which may be identified

TABLE 2

| Mic | 704a | 704b | 704c | 704d | 704e | 704f | 706a | 706b | 706c | 706d | 706e | 706f |
|---|---|---|---|---|---|---|---|---|---|---|---|---|
| 704a | — | | | | | | | | | | | |
| 704b | $R_{704b,\ 704a}$ | — | | | | | | | | | | |
| 704c | $R_{704c,\ 704a}$ | $R_{704c,\ 704b}$ | — | | | | | | | | | |
| 704d | $R_{704d,\ 704a}$ | $R_{704d,\ 704b}$ | $R_{704d,\ 704c}$ | — | | | | | | | | |
| 704e | $R_{704e,\ 704a}$ | $R_{704e,\ 704b}$ | $R_{704e,\ 704c}$ | $R_{704e,\ 704d}$ | — | | | | | | | |
| 704f | $R_{704f,\ 704a}$ | $R_{704f,\ 704b}$ | $R_{704f,\ 704c}$ | $R_{704f,\ 704d}$ | $R_{704f,\ 704e}$ | — | | | | | | |
| 706a | $R_{706a,\ 704a}$ | $R_{706a,\ 704b}$ | $R_{706a,\ 704c}$ | $R_{706a,\ 704d}$ | $R_{706a,\ 704e}$ | $R_{706a,\ 704f}$ | — | | | | | |
| 706b | $R_{706b,\ 704a}$ | $R_{706b,\ 704b}$ | $R_{706b,\ 704c}$ | $R_{706b,\ 7046d}$ | $R_{706b,\ 704e}$ | $R_{706b,\ 704f}$ | $R_{706b,\ 706a}$ | — | | | | |
| 706c | $R_{706c,\ 704a}$ | $R_{706c,\ 704b}$ | $R_{706c,\ 704c}$ | $R_{706c,\ 704d}$ | $R_{706c,\ 704e}$ | $R_{706c,\ 704f}$ | $R_{706c,\ 706a}$ | $R_{706c,\ 706b}$ | — | | | |
| 706d | $R_{706d,\ 704a}$ | $R_{706d,\ 704b}$ | $R_{706d,\ 704c}$ | $R_{706d,\ 704d}$ | $R_{706d,\ 704e}$ | $R_{706d,\ 704f}$ | $R_{706d,\ 706a}$ | $R_{706d,\ 706b}$ | $R_{706d,\ 706c}$ | — | | |
| 706e | $R_{706e,\ 704a}$ | $R_{706e,\ 704b}$ | $R_{706e,\ 704c}$ | $R_{706e,\ 704d}$ | $R_{706e,\ 704e}$ | $R_{706e,\ 704f}$ | $R_{706e,\ 706a}$ | $R_{706e,\ 706b}$ | $R_{706e,\ 706c}$ | $R_{706e,\ 706d}$ | — | |
| 706f | $R_{706f,\ 704a}$ | $R_{706f,\ 704b}$ | $R_{706f,\ 704c}$ | $R_{706f,\ 704d}$ | $R_{706f,\ 704e}$ | $R_{706f,\ 704f}$ | $R_{706f,\ 7046}$ | $R_{706f,\ 706b}$ | $R_{706f,\ 706c}$ | $R_{706f,\ 706d}$ | $R_{706f,\ 706e}$ | — | using any combination of playback device identifiers (e.g., model number, serial number, supplier identifier) or microphone identifiers (e.g., model number, serial number, supplier identifier), or other calibration identifier indicating the same combination of playback device identifier and microphone identifier. Using the identifiers, playback devices 700 may be pre-loaded with representative calibration data during manufacturing or prior to providing the playback device to a user such that the playback device is ready to adjust directional focus of its microphone arrays. In some aspects, the response values for the playback device may be loaded or updated upon connection of the playback device to a network. The values may be retrieved by or transmitted to the playback device from a computing device over a network. In some instances, the loading or updating of the values may occur during a playback device setup process or other calibration process for the playback device (e.g., environmental playback device tuning), playback equalizer adjustment process).

At block 804, the orientation of the playback device may be determined. The orientation may be determined based on sensors (e.g., accelerometer, gyroscope, etc.) in playback device 700. Orientation of a playback device may be determined as described in application Ser. No. 13/186,249 filed on Jul. 19, 2011 and issued as U.S. Pat. No. 9,042,556 on May 26, 2013 and application Ser. No. 14/696,041 filed on Apr. 24, 2015 and published as U.S. Patent Application Publication 2016/0315384 A1 on Oct. 27, 2016, the contents of both are incorporated by reference in their entirety. Orientations of the playback device may be predetermined. For example, the predetermined orientations may correspond to orientations for which training responses were measured in block 802.

At block 806, one or more microphone arrays may be determined for use to capture or process sound input. Playback device 700 may have a single microphone array in which case the single microphone array would be selected to be used in sound input capture. In some aspects, playback device 700 may have more than one microphone array in which case one or more than one microphone array may be selected.

A number of microphone arrays 702 and the particular microphone arrays that are selected for use may depend on a variety of factors such as location of the microphone array 702, available processing capability, orientation of the playback device, and/or other contextual information (e.g., position of microphone in relation to the environment).

When evaluating the amount of processing capability available, playback device 700 or other device in the system can base the evaluation on the processing power available to playback device 700 locally, to playback device 700 over one or more networks (e.g., local area network, wide area network), and/or to playback device 700 via one or more computing devices. For example, the selected microphone arrays of playback device 700 may capture an initial portion of the sound input and transmit the data representing the captured initial portion to another device (e.g., server, control device, other playback devices) to process for location information. In some aspects, playback device 700 may process the data locally to determine location information associated with the sound input.

The number of microphone arrays to use may be determined during an initial setup process and/or during a playback device calibration process in a playback environment (e.g., tuning of playback device based on playback environment).

In some aspects, the microphone array that is on top of the playback device may be selected. In some instances, the microphone array most sensitive to sound in front of the playback device may be selected. In yet more aspects, the microphone most perpendicular to gravity may be selected. A weighting or preference order of microphone arrays may be given based on the orientation of playback device.

If playback device 700 has only a single microphone array 702 or only one microphone array of a plurality of microphone arrays 702 is selected to be enabled or used for sound input capture or processing, the one selected microphone array 702 may be enabled or activated for sound input capture. In some aspects, adjustment of directional focus of the microphone array(s) might not be necessary, and playback device 700 may be ready to process sound input for execution of the command after selecting one or more microphone arrays to enable or activate.

After the microphone array(s) to be enabled have been determined, the system may identify sets of response data which correspond to the selected microphone array and orientation of playback device 700. For example, if playback device 700 is currently oriented in the first orientation as illustrated in FIG. 7A and microphone array 702*a* is selected or activated for sound input, the system (e.g., any of device of FIG. 5) may identify a group of response values which correspond to microphone array 702*a* and the current orientation (e.g., the first orientation) of playback device 700.

At block 808, sound input may be detected by the selected microphone array(s). For example, the selected microphone array(s) may be continuously monitoring for the start of a voice command. A voice command may begin with an activation word or phrase (e.g., wake-up word, hotword) to notify the system that a user speaking the command is preparing to speak a command for execution by the system. Uttering the activation word can cause the system to begin processing the words spoken after the activation word for a voice command. Upon detecting the start of the voice command which may be after detection of the utterance of the activation word or include detection of the utterance of the activation word, the selected microphone array may begin capturing (e.g., recording, streaming, processing) the sound input (e.g., voice input) for voice command processing.

At block 810, the location (e.g., direction in one or more dimensions, direction in one or more planes) of the source of the sound input (e.g., voice input, audio input) may be determined. The location of the source of the sound input may be determined to varying degrees of precision. For example, the location may be an exact direction or an approximate direction per microphone array or for playback device 700 or may be a direction relative to the selected microphone array(s) or playback device 700. A portion or sample of the sound input may be captured and used in determining the location of the source of the sound input. For example, the sound input sample may be in the form of the response picked up by each of the individual microphones of the selected microphone array. The response values may be the actual response picked up by each of the individual microphones or may be relative values between different pairs of individual microphones of the microphone array. These values may be calculated in a manner similar to the training response values obtained in block 802. For example, the received sample input may be processed in the same manner as the test audio where differences between different pairs of individual microphones of one or more microphone arrays may be calculated. In other words, the received sample input may be organized into the same format as Table 1 or Table 2 where the angle association is unknown and will be determined in block 810.

The response values of the sound input sample may be compared to the training response values to determine a direction relative to the microphone array or playback device of the source of the input. The comparison may involve comparing each set of training response values to determine which set of values corresponds to the sample input response. Because each set of training response values corresponds to an angle value, the direction of the sound input may correspond to the angle value of the set of training responses which corresponds to the sound input. A probability function (e.g., probability distribution function (pdf), gaussian distribution) may be used to determine a most likely direction of the sound input by determining to which training response set or value the sample input response correlates and the corresponding angle position of the training response set or value.

In the aspect where a single microphone array is active or enabled, the sample input response values may be compared to the group of training response values associated with the one microphone array for all test position angles to determine a most likely direction of the sound input. For example, the set of sample response values may be inputted into a probability function such as a probability density function and compared to the set of response values in Table 1 to determine a likelihood that the direction of the sound input is from the 0 degree position. The result of the probability function may be a probability value (e.g., probability density function distance value) indicating the probability that the sound input direction is the direction (e.g., 0 degree position) associated with the set of values. In some aspects, the probability value may be a percentage where the larger the percentage the greater the likelihood that the sound input value corresponds with the direction associated with the set of values. In other aspects, the probability value may be the probability density function distance value where the smaller the value the greater the likelihood the sound input value corresponds to the direction associated with the set of values.

The sample input response values may be compared to a subset of the group of values or the entire group of values producing a probability value for each of the subset or group of values. For example, training responses may have been obtained for every 5 degrees between 0 to 360 degrees. Such a high resolution of data might not be necessary, and the system may compare training responses for every 10 degrees between 0 to 360. In some instances, training responses may be compared for every 20 degrees, and the comparison process may be repeated for every x number of degrees (e.g., 1 degree, 5 degrees, etc.) within the range of ±a certain number of degrees (e.g., 10 degrees, 15 degrees, etc.) of a most likely corresponding direction as indicated by a probability value. In the instance where, for example, a probability density function distance value represents the probability, the minimum or smallest probability density function distance value and its associated degree position may correspond to the most likely direction of the sound input.

As discussed herein, in some aspects, two or more microphone arrays may be active for detecting and recording sound input. The processing for two or more microphone arrays may be performed for each selected microphone array individually. For example, the sample input response may be compared to the group of response values for one microphone array at a time producing a set of probability values for each of the two or more microphone arrays. The values within the set of probability values may each represent the likelihood that the source of the sound input is from a given direction.

The set of probability values for a particular microphone array may be assigned a weight. The assigned weight may be the weight associated with the particular microphone array which can vary depending on the orientation of the playback device. For example, in the vertical orientation shown in FIG. 7B, the values associated with microphone array 702c may be given a greater weight than the values associated with microphone array 702a since microphone array 702c may provide more useful information regarding a location of the audio source than a more vertical microphone.

The sample input response may be compared to the group of response values for all individual microphones in the microphone arrays at the same time. For example, the sound input values may be organized as a set of input response values with relative response values for every unique combination of pairs of individual microphones. The set of input response values may be compared to one or more sets of training response values where a set of training response values contains training response values for every unique combination of pairs of individual microphones.

Similar to the earlier discussion, response values for certain microphone arrays may be weighted more heavily by weighting the corresponding probability value produced for that microphone array.

Similarly, the sample input response values may be compared to vectors of training response values.

As discussed herein, a response value may have two components, a magnitude component and a phase component. The magnitude may indicate the loudness or amplitude of the sound received by a microphone, and the phase may indicate the timing of a sound received by the microphone. For example, a comparison of phase information between two microphones may indicate that one microphone received a particular sound before another microphone. Phase information may be used to identify when a received sound is a reflection.

In the comparisons between the sample input response and training response values discussed herein, any combination of magnitude and phase of the response values may be compared in determining the likelihood that a sound source is in a particular direction. For example, only the magnitudes might be compared, only the phase values might be compared, or the magnitudes and phase values may be compared.

At block 812, the directional focus of the selected microphone array(s) may be adjusted based on the location of the source determined in block 810. For example, the location information can be used to inform beamforming and/or acoustic echo correction (aec) processes during the voice input capture process to improve the quality of the voice input captured.

At block 814, the sound input may be captured based on the adjusted directional focus of the microphone array. For example, the selected microphone array(s) may be beamformed in a direction determined based on the location determined in block 810. In some instances, an adjust might not be necessary. For example, the system may determine that an existing or current directional focus may be appropriate or sufficient, or the system may determine that directional focus might not be necessary sound input capture.

At block 816, the captured sound input may be processed to identify any voice commands contained in the sound input. The captured sound input may be converted from speech to text, and at block 818, any commands contained in the sound input for the media playback system may be executed.

Blocks 804 to 806 may be repeated each time playback device 700 or other device in the system determines that the orientation and/or positioning of playback device 700 has been changed when in a media playback environment (e.g., environment illustrated in FIG. 1). For example, sensors (e.g., accelerometer, gyroscope) in a playback device can determine when there has been movement and/or a change in orientation.

Method 800 or a subset of the blocks of method 800 may be repeated periodically, aperiodically, and/or in response to particular events occurring (e.g., tuning of playback characteristics to an environment, setup in a new environment, change in device orientation).

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A tangible, non-transitory computer-readable medium storing instructions that when executed by a processor cause a playback device to perform functions comprising:
   determining an orientation of the playback device, wherein the playback device comprises at least one microphone array;
   determining at least one microphone training response for the playback device from a plurality of microphone training responses based on the orientation of the playback device;
   detecting, via the at least one microphone array, a sound input;
   determining a location of a source of the detected sound input based on the determined at least one microphone training response and the detected sound input;
   adjusting directional focus of the at least one microphone array based on the determined location of the source; and
   capturing additional sound input based on the adjusted directional focus of the at least one microphone array.

2. The computer-readable medium of claim 1, further comprising:
   determining at least one microphone array to enable for sound capture based on the orientation of the playback device.

3. The computer-readable medium of claim 1, wherein determining the at least one microphone training response for the playback device from the plurality of microphone training responses based on the orientation of the playback device comprises:
   identifying a set of microphone training responses for the at least one microphone array corresponding to the orientation of the playback device from the plurality of microphone training responses.

4. The computer-readable medium of claim 3, wherein determining the location information of the source of the detected sound input based on the at least one microphone training response and the detected sound input comprises:
   comparing the detected sound input to the set of microphone training responses; and
   determining a respective direction of the detected sound input for each of the at least one microphone array.

5. The computer-readable medium of claim 4, wherein comparing the detected sound input to the set of microphone training responses comprises:
   comparing at least one of magnitudes and phases of the set of microphone training responses to at least one of magnitude and phase of the detected sound input.

6. The computer-readable medium of claim 1, wherein the playback device comprises a first microphone array and a second microphone array, and
   wherein the method further comprises:
      selecting the first microphone array for sound input capture, and
   wherein determining the at least one microphone training response for the playback device from the plurality of microphone training responses based on the orientation of the playback device comprises:
      determining a set of microphone training responses corresponding to the first microphone array and the orientation of the playback device.

7. The computer-readable medium of claim 1, wherein the playback device comprises a first microphone array and a second microphone array, and wherein the method further comprises:
selecting the first microphone array and the second microphone array based on a first orientation of the first microphone array and a second orientation of the second microphone array.

8. A playback device, comprising:
a processor; and
memory storing instructions that when executed by the processor cause the playback device to perform functions comprising:
determining an orientation of the playback device, wherein the playback device comprises at least one microphone array;
determining at least one microphone training response for the playback device from a plurality of microphone training responses based on the orientation of the playback device;
detecting, via the at least one microphone array, a sound input;
determining a location of a source of the detected sound input based on the determined at least one microphone training response and the detected sound input;
adjusting directional focus of the at least one microphone array based on the determined location of the source; and
capturing additional sound input based on the adjusted directional focus of the at least one microphone array.

9. The playback device of claim 8, wherein the functions further comprise:
determining at least one microphone array to enable for sound capture based on the orientation of the playback device.

10. The playback device of claim 8, wherein determining the at least one microphone training response for the playback device from the plurality of microphone training responses based on the orientation of the playback device comprises:
identifying a set of microphone training responses for the at least one microphone array corresponding to the orientation of the playback device from the plurality of microphone training responses.

11. The playback device of claim 10, wherein determining the location information of the source of the detected sound input based on the at least one microphone training response and the detected sound input comprises:
comparing the detected sound input to the set of microphone training responses; and
determining a respective direction of the detected sound input for each of the at least one microphone array.

12. The playback device of claim 11, wherein comparing the detected sound input to the set of microphone training responses comprises:
comparing at least one of magnitudes and phases of the set of microphone training responses to at least one of magnitude and phase of the detected sound input.

13. The playback device of claim 8, wherein the playback device further comprises a first microphone array and a second microphone array, and
wherein the method further comprises:
selecting the first microphone array for sound input capture, and
wherein determining the at least one microphone training response for the playback device from the plurality of microphone training responses based on the orientation of the playback device comprises:
determining a set of microphone training responses corresponding to the first microphone array and the orientation of the playback device.

14. The playback device of claim 8, wherein the playback device further comprises a first microphone array and a second microphone array, and wherein the method further comprises:
selecting the first microphone array and the second microphone array based on a first orientation of the first microphone array and a second orientation of the second microphone array.

15. A method, comprising:
determining an orientation of the playback device, wherein the playback device comprises at least one microphone array;
determining at least one microphone training response for the playback device from a plurality of microphone training responses based on the orientation of the playback device;
detecting, via the at least one microphone array, a sound input;
determining a location of a source of the detected sound input based on the determined at least one microphone training response and the detected sound input;
adjusting directional focus of the at least one microphone array based on the determined location of the source; and
capturing additional sound input based on the adjusted directional focus of the at least one microphone array.

16. The method of claim 15, wherein the functions further comprise:
determining at least one microphone array to enable for sound capture based on the orientation of the playback device.

17. The method of claim 15, wherein determining the at least one microphone training response for the playback device from the plurality of microphone training responses based on the orientation of the playback device comprises:
identifying a set of microphone training responses for the at least one microphone array corresponding to the orientation of the playback device from the plurality of microphone training responses.

18. The method of claim 17, wherein determining the location information of the source of the detected sound input based on the at least one microphone training response and the detected sound input comprises:
comparing the detected sound input to the set of microphone training responses; and
determining a respective direction of the detected sound input for each of the at least one microphone array.

19. The method of claim 18, wherein comparing the detected sound input to the set of microphone training responses comprises:
comparing at least one of magnitudes and phases of the set of microphone training responses to at least one of magnitude and phase of the detected sound input.

20. The method of claim 15, wherein the playback device comprises a first microphone array and a second microphone array,
wherein the method further comprises:
selecting the first microphone array for sound input capture, and
wherein determining the at least one microphone training response for the playback device from the plurality of microphone training responses based on the orientation of the playback device comprises:

determining a set of microphone training responses corresponding to the first microphone array and the orientation of the playback device.

* * * * *